Oct. 27, 1931.   G. J. ARMSTRONG   1,829,433

TIRE CHANGER

Filed April 7, 1931

INVENTOR

George J. Armstrong

Ralph Burch

Patented Oct. 27, 1931

1,829,433

UNITED STATES PATENT OFFICE

GEORGE J. ARMSTRONG, OF MAPLE CREEK, SASKATCHEWAN, CANADA

TIRE CHANGER

Application filed April 7, 1931. Serial No. 528,609.

This invention relates to improvements in a rim puller. Its primary object being to provide a simple means of splitting the so-called split rim of an automobile wheel so that the tire may be removed. A further object is to provide an apparatus of the above description that is inexpensive to manufacture and has only a few working parts and is efficient to operate.

With these and other objects in view, as will appear as the description proceeds, the invention consists in the novel construction and arrangement of parts as hereinafter more specifically set forth, claimed and shown in the accompanying drawings forming a part of this application and in which:

Figure 1:
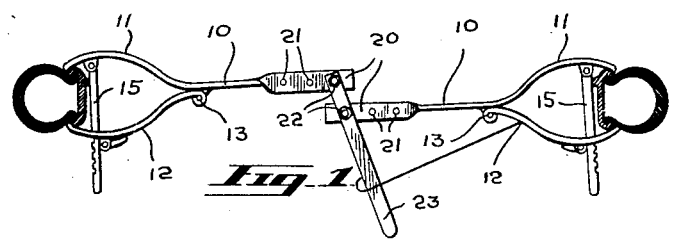
Fig. 1 is a view of the rim puller attached to the rim in normal position.
Figure 2:
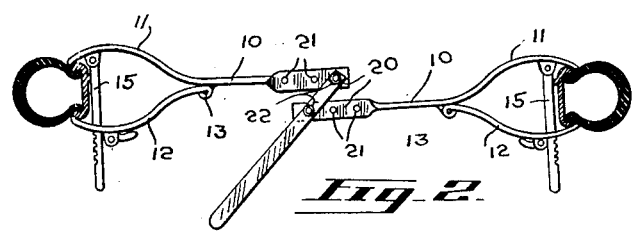
Fig. 2 is a view of the rim puller attached to the rim in the "split" position to remove tire.
Figure 3:
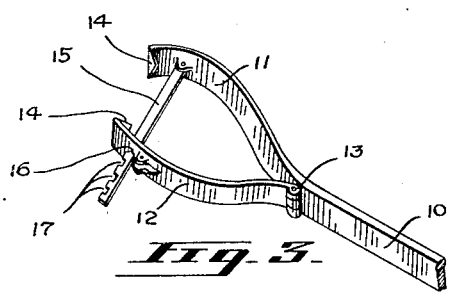
Fig. 3 is an enlarged view of one of the jaws.
Figure 4:
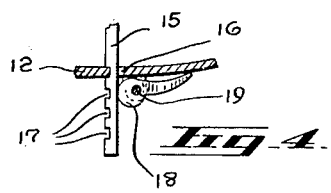
Fig. 4 is a detail view of the jaw clamp.

Referring more in detail to the drawings in which similar characters designate corresponding parts throughout the several views it will be seen that the invention comprises a pair of arms 10 having their outer ends 11 forming one half of a jaw and having a similar end 12 to form the other half of the jaw hinged to said arm 10 and 13. The extremities of these jaws are formed into hooks 14 so as to give the jaw a perfect grip on the rim. A bar 15 is hinged to the jaw 11 and fits through a slot 16 in the jaw 12 as shown more distinctly in Fig. 4. This bar 15 has a number of notches 17 in its outer edge designed to fit the thickness of the jaw 12. An eccentric lever 18 hinged at 19 on the jaw 12 is provided to keep the notch 17 engaged in the edge of the slot 16 while the rim puller is in use. The inner ends 20 of the arms 10 are provided with holes 21 to receive bolts 22 which form pivots upon which a lever 23 is worked. These holes 21 are to provide for adjustment of the apparatus to varying sizes of rims.

Thus it will be seen that when it is desired to take off a tire the jaws are first fitted to the rim then clamped tightly by means of the bar with the notches and the eccentric lever thus preventing the jaws from opening when in use. The lever is then worked sideways and the rim is thus split to remove the tire. When the tire is to be replaced the lever is moved in the opposite direction, the pressure being taken by the bar 15 which fits tight to the inner side of the rim.

It is believed that the construction and advantages of the structure shown may be apparent from the foregoing paragraphs taken in connection with the accompanying drawings without further detailed description.

While the preferred embodiment of the invention has been disclosed it is understood that minor changes in the details of construction, combination of parts and arrangement of co-operating elements may be resorted to within the scope of what is claimed without departing from the spirit of the invention.

What I claim is:

A rim tool of the character described comprising a pair of arms, adjustable jaws at the outer ends of said arms adapted to grip the sides of the rim, means connected with the inner ends of said arms for expanding and contracting the arms, a rack bar having one end pivotally connected to one side of said jaws and its opposite end extending through a slot in the other side of the jaws for regulating the adjustment of the jaws, said bar being disposed adjacent the mouth of said jaws and adapted to bear against the bottom of the rim when arms are expanded, and a cam for holding said rack bar in engagement with said slot.

In testimony whereof I affix my signature.

GEORGE J. ARMSTRONG.